United States Patent

Kullmann

[15] 3,673,376
[45] June 27, 1972

[54] METHOD FOR ATTACHING THE INNER END OF A BALANCE SPRING TO ITS COLLET

[72] Inventor: Jean-Claude Kullmann, Rue de la Ruche 39, La Chaux-de-Fonds, Canton, Neuchatel, Switzerland

[22] Filed: Aug. 19, 1969

[21] Appl. No.: 851,315

[30] Foreign Application Priority Data

Aug. 26, 1968 Switzerland .......................... 12748/68
Feb. 10, 1969 Switzerland ............................ 2005/69

[52] U.S. Cl. ........................................ 219/121 LM, 58/115
[51] Int. Cl. ......................................................... B23k 9/00
[58] Field of Search .................................... 219/121; 58/115

[56] References Cited

UNITED STATES PATENTS 3,071,365  1/1963  Henchoz .............................. 58/115 X

OTHER PUBLICATIONS

" Theory and Application of Pulse Laser Welding" Welding Journal, Dec. 1965, pp. 1018–1026
" Laser Beam Welding Electronic–Component Leads" Welding Research Supplement, June 1965, pp. 264–S– 269–S
" Laser Applications" IEEE Spectrum May 1965 pp. 82– 92

Primary Examiner—J. V. Truhe
Assistant Examiner—George A. Montanye
Attorney—Stevens, Davis, Miller & Mosher

[57] ABSTRACT

The balance spring and the collet are held in precise positions on a work table so that the upper edge of the inner end of the spring is flush with an upper face of the collet and at least sufficiently near to the latter to enable a laser beam aimed at this zone to weld together the collet and the spring.

10 Claims, 9 Drawing Figures

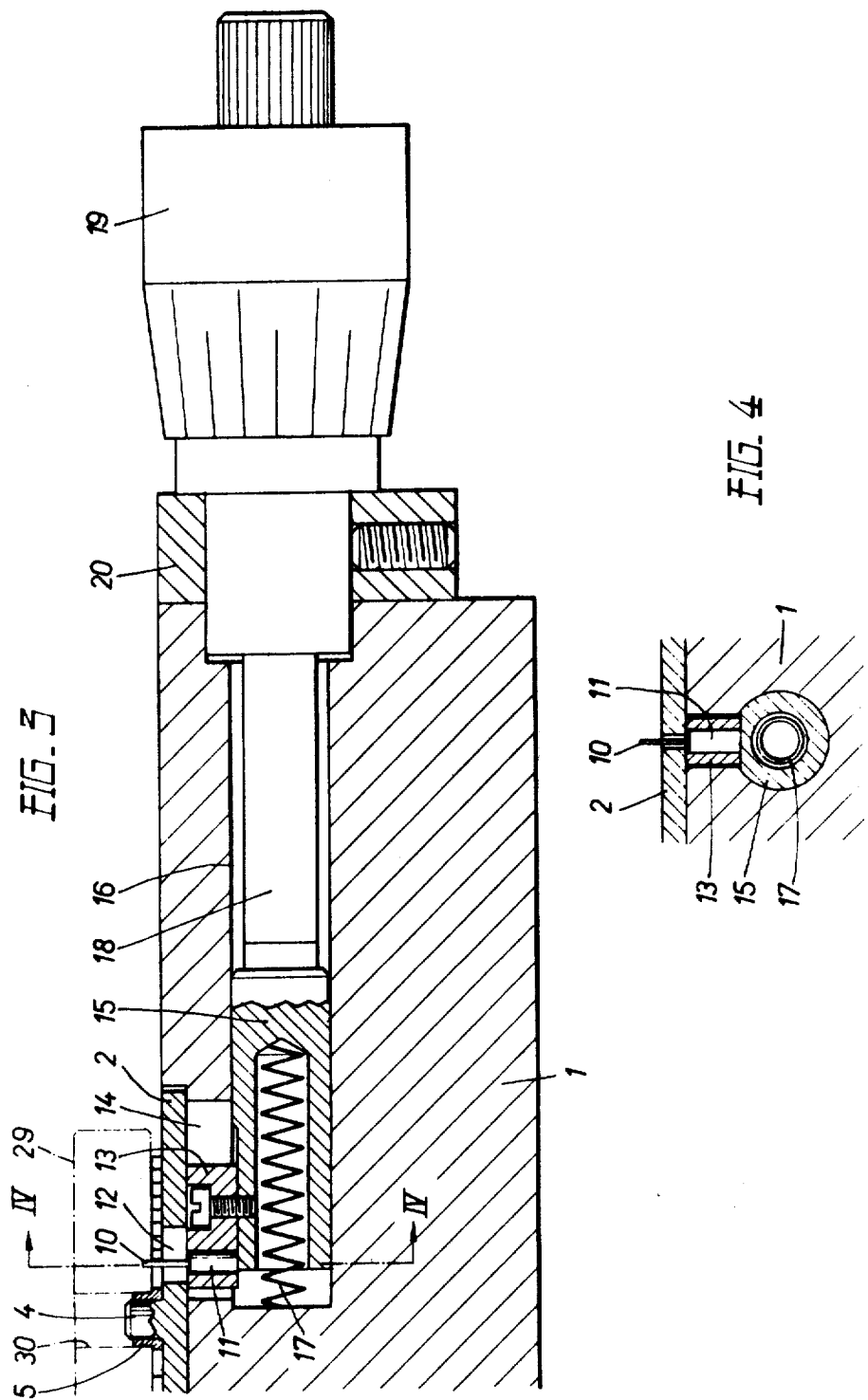

METHOD FOR ATTACHING THE INNER END OF A BALANCE SPRING TO ITS COLLET

BACKGROUND OF THE INVENTION

The invention relates to methods and means for attaching the inner end of a timepiece balance spring to its collet, whereby the original shape of this end is preserved. The invention also relates to the resulting colleted balance springs.

To avoid, on the one hand, distorting the spring in those cases where its inner end is fixed by a pin in a transverse slot of the collet and, on the other hand, the delicate bending of the spring end along a secant of the collet, several ways are known of fixing the spring without distorting the shape of the spring inner end.

With certain of these methods the problem is solved in a purely mechanical way. They have the drawback of requiring the manufacture of a collet that is relatively complicated in shape and, moreover, usually composed of several pieces. Some of these collets have the disadvantage that they unbalance the balance because of their assymetrical shape. It is very difficult to ensure that the center of gravity of the collet is located at the collet axis.

In another known method, the spring is fixed to the collet by injecting synthetic plastic.

This method has the drawback of requiring the manufacture of an extremely delicate mold into which it is difficult to insert the collet and balance spring automatically. Moreover, this method does not ensure that the spring preserves its original shape. On the contrary, the shape can be distorted, first, by the stream of synthetic plastic injected into the mold and, second, while the plastic is curing, since it nearly always undergoes distortions of a more or less severe nature.

Still other methods are known in which the spring is fixed by soldering, welding, or gluing, in order to avoid having the collet extend beyond the exterior of the inner coil of the balance spring.

These methods, all requiring that the collet touch the spring along part of the spring's length, nevertheless have the disadvantage of necessitating the manufacture of a collet of complicated shape, if the slightest distortion of the inner part of the spring is to be avoided. A collet of this kind has the drawback of unbalancing the balance, as do the collets used for the purely mechanical methods of fixing the spring. In addition, the methods using soldering, welding, and gluing have the further disadvantage that the spring is poorly attached, because it becomes loose from the collet after some time.

SUMMARY OF THE INVENTION

An object of the invention is to provide a method that is free of all of these drawbacks and which can be carried out automatically.

In accordance with one embodiment, the method includes the steps of placing the balance spring and the collet together in the positions they will occupy after the spring is attached, so that the spring is completely relaxed and the collet touches the spring at least along a line of contact parallel to the axis of the spring without in the least distorting the latter, the spring having an edge and the collet a face that are flush at, or along, this line of contact, firmly holding the spring and collet in their respective positions, and focussing a laser beam, directed at least approximately along this line of contact, on the flush edge and face of the spring and collet surrounding the line of contact.

In carrying out this method, a laser beam can be focussed to make a weld confined as nearly as possible to a point and having a depth extending to about one-half of the height of the spring.

Pulling tests have shown, however, that if the spring is welded over too great a part of its height there is a very great risk that the spring will break at the spot where it leaves the collet.

It has been shown, nevertheless, that this danger can be avoided without reducing the strength of the weld. However, this danger can also be avoided by making a welded zone of another shape, which is extended more along the length of the spiral, rather than being made deeper.

In this embodiment, the spring so rests against the collet that a peripheral zone of the latter is sufficiently close to the spring to enable a laser beam, focussed on this zone and the adjacent spring edge, to weld to the collet a segment of the spring having a length at least equal to the height of the spring, without moving either the spring or the collet. Preferably, the intensity of the laser beam is adjusted to weld the upper part of the spring to the collet to a depth not exceeding one-half of the spring height and along a length at least equal to the spring height.

The intensity of the beam is preferably adjusted to make a weld having a depth not exceeding one-third of the spring height.

In order to lengthen the weld along the spring without touching the next coil or affecting too large an area of the collet, it is possible to proceed in two different ways. The laser beam can be shaped using a generally rectangular diaphragm, so that only a very narrow zone of the beam strikes the collet along the spring segment that is to be welded to it ; or the beam focus can be moved along the spring segment to make a series of spot welds.

The invention also relates to apparatus for carrying out these methods.

In common with known apparatuses for fixing the spring inner end to the collet, the apparatus of the invention comprises a work table and means thereon for holding the collet in a precise position.

In one embodiment, the apparatus comprises two pins projecting from the table and so positioned that the pins together with the collet hold the balance spring in a precisely centered position without distorting the spring.

In a particular form of this embodiment, the apparatus can be very simply used with balance springs of different sizes, coiled right or left.

First, each of the two pins lies in a respective radial plane spaced 120° from the other, and passing through the collet axis and through the line of contact along which the beam is directed to weld the spring and collet together. Second, the position of each pin is adjustable in its radial plane in the direction of the collet axis. Third, the means for holding the collet in a precise angular position are adjustable.

In another embodiment, the apparatus comprises a work table, a projection provided on the table for receiving the collet and the balance spring, an outer face incorporated by the projection matching the shape of the inner coil of the balance spring, and an inner face incorporated by the projection forming a cavity for receiving the collet and holding it securely in a precise angular position.

In order to avoid having to cut off the spring inner end at a precise point, the outer face of the projection preferably matches only the active part of the inner spiral including the segment that is welded. The projection has an opening which makes room for the spring inner end extending beyond the weld and for the laser beam.

To hold the collet in a precise angular position, the inner face of the projection is advantageously made by driving into the latter a tool having the outer shape of the collet.

Finally, the invention also relates to the colleted balance springs obtained by the methods of the invention.

The colleted balance springs of the invention are therein characterized that the balance spring is welded to the collet base having a thickness at least approximately equal to the spring height and an outline symmetrical about the collet axis.

This latter feature enables the manufacture of perfectly balanced collets that do not, therefore, disturb the balance of the combination of the oscillating balance and balance spring.

The collect base can be diamond shaped, having an arm that balances the arm to which the spring is welded.

It has been noticed, however, that when a colleted balance spring of this kind is subjected to shocks perpendicular to the collet axis and having a strength of the order of those to which watches equipped with means for protecting the pivots are subjected by the official watch testing offices, the balance spring distorts so severely under the effect of inertia that the spring's elastic limit is exceeded at the point where the spring leaves the collect base arm to which it is welded. These shocks bend the spring at right angles to the edge of this arm.

In another embodiment, the balance spring is welded to an arm of the collet base having a thickness at least approximately equal to the spring height, the width of this arm at its end being approximately equal to the length of the spring segment welded to it, and the collet base further comprising a balancing arm diametrically opposite the aforesaid arm and stop arms between the two aforesaid arms.

The manufacture of the collet is simplified by providing four arms spaced 90° apart, a measure which also enables the balance spring to be welded to any one of the arms

BRIEF DESCRIPTION OF THE DRAWINGS

The invention will be described, with reference to the Figures of the accompanying drawings, wherein:

FIG. 3 is a schematic sectional view, on expanded scale, taken along line III—III of FIG. 2, FIG. 4 is a transverse section taken along line IV—IV of FIG. 3.

DESCRIPTION OF THE PREFERRED EMBODIMENTS

Figure 1:
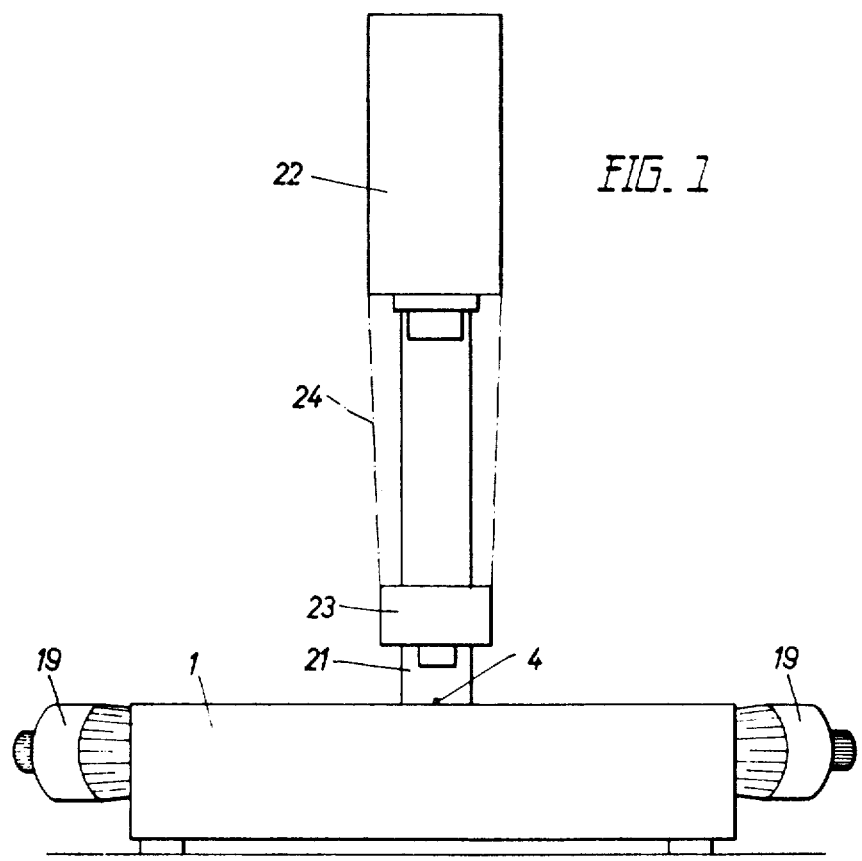
FIG. 1 is a schematic elevation view of the complete apparatus.

The first embodiment of the invention comprises a bed 1 to which is fixed a work table 2 consisting of a circular plate removably fixed to the bed by screws 3. At its center the plate carries a stud 4, the diameter of which fits the bore of the cylinder 5 of the production run of collets 6. To ensure that the embodiment can be used with any run of collets that are to be fixed to balance springs that coil in a given direction, there can be provided either a set of plates, one for each run of collets, with the stud 4 permanently fixed to the plates 2, or a single plate with a set of independent studs which can be removably fixed to the plate. The collet 6 is precisely oriented with respect to the stud 4 by two studs 7 with eccentric heads (FIG. 6), of which the shanks are held by friction fit in the corresponding holes of the plate 2.

The balance spring 8 is precisely centered on the plate 2 by two cylindrical pins 9 and 10, which project from the plate 2. Each pin is carried by a shank 11 (FIGS. 3 and 4) in a radial slot 12 of the plate 2. The base of the shank 11 is fixed to a shoe 13 in a passage 14 provided underneath the plate 2 in the bed 1. The shoe 13 is fixed to a piston 15 sliding in a bore 16 of the bed 1.

In a modification, the upper part of the pins 9 and 10 contacting the balance spring can be machined to form a cylindrical sector having, for example, a central angle of 90° and the pins so positioned that the spring contacts these pins along the edges of their cylindrical sectors.

This modification has the advantage that pins of twice the diameter can be used, which increases their rigidity and stability. These pins have the further advantage of facilitating the centering of the spring 8 on the plate 2, because contact between the balance spring and the edge of the cylindrical sector located along the axis of the pin is more easily and precisely observed than contact with a completely cylindrical pin.

Figure 2:
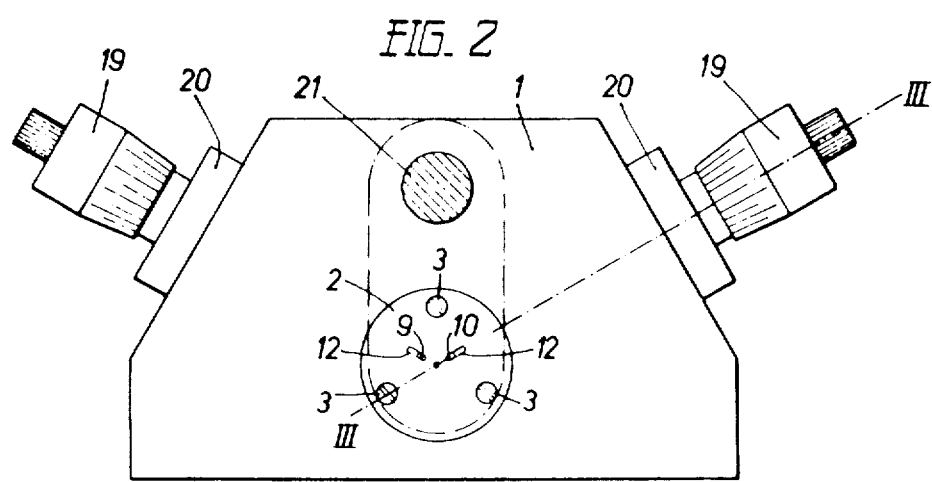
FIG. 2 is a top view of the apparatus seen in FIG. 1, a part of the apparatus being cut away.

FIG. 2 and 3 show that the bores 16 and the passages 14 are parallel to the slots 12 in the plate 2.

A compression spring 17 pressing against the end of the bore 16 pushes the piston 15 against the spindle 18 of a micrometer 19 fixed to the bed 1 by a sleeve 20. The micrometer has a locking mechanism, not shown. The 2 micrometers enable the positions of the pins 9 and 10 to be adjusted very precisely with respect to the stud 4.

A post 21 is fixed to the bed 1 and carries the generator 22 for the laser beam, a focussing optical system 23 containing the controls (not shown) for focussing, and a protective sleeve 24. Controls (not shown) are provided between the post 21 and the generator 22 and optical system 23 for aiming the laser beam at the desired spot.

Figure 5:
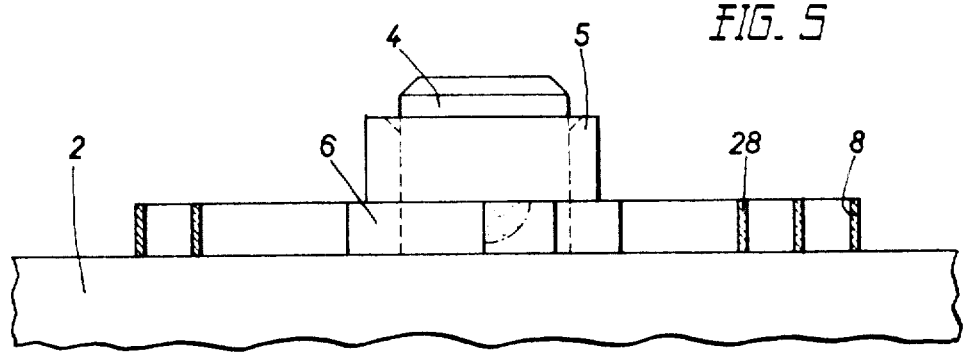
FIG. 5 is a detail of FIG. 3 on still larger scale.
Figure 6:
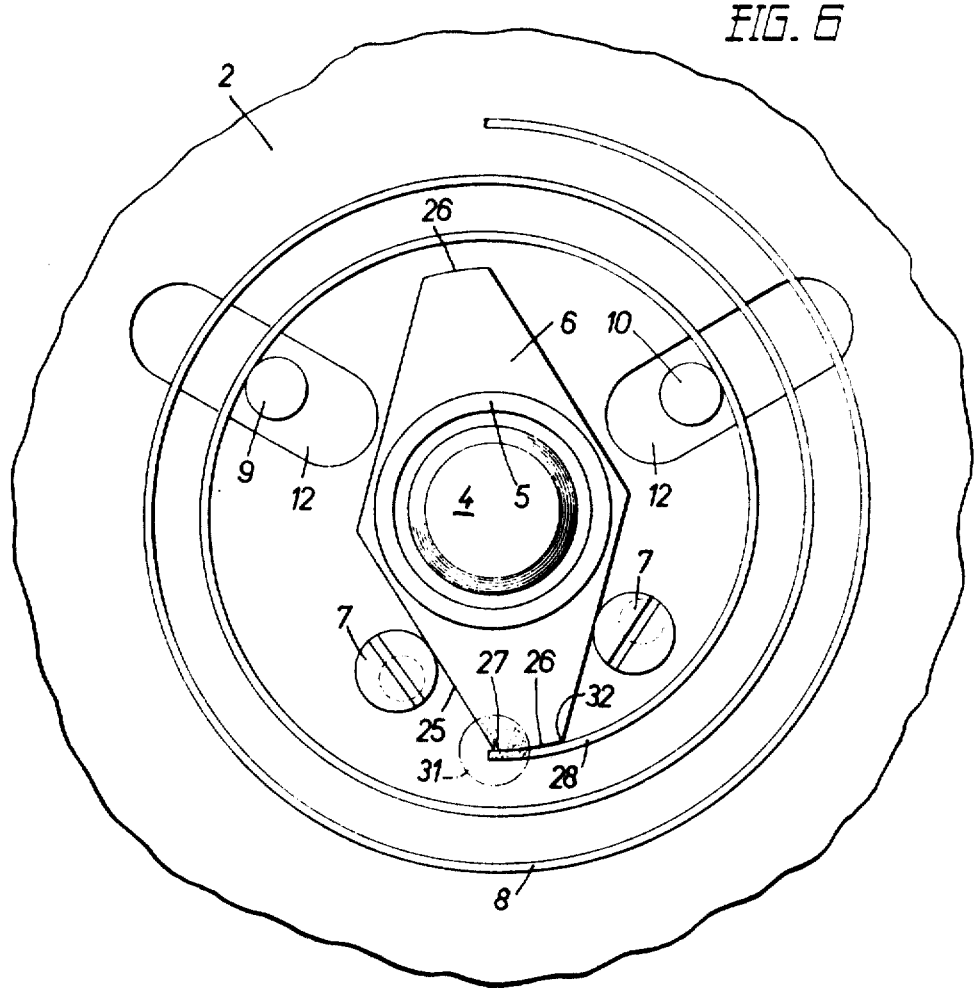
FIG. 6 is a top view of the part shown in FIG. 5.

In the first embodiment, the balance spring 8 must be attached to a collet 6 having a base, or wings, 25 that is approximately as thick as the spring 8 is high, as is apparent from FIG. 5. In top view, the two wings together being somewhat diamond shape (FIG. 6), their ends being circular arcs located at the ends of the major diagonal and centered on the axis of the collet. FIG. 6 shows that the collet 6 with its wings is perfectly symmetrical about its axis, so that the collet cannot disturb the equilibrium of the balance and its spring.

Inasmuch as the shape of the collet is very simple, the collet can be easily manufactured by profile turning out of a round bar. The rounded ends 26 of the wings 25 are machined during the same operation. The straight side edges of the wings can be machined using parallel milling cutters, the headstock of the automatic lathe being stopped twice. Preferably, however, a circular base is cut on the automatic lathe and the straight side edges stamped out. At the same time, the diameter of the central bore of the collet can be corrected and precisely dimensioned. The collet 6 can also be manufactured by stamping using progressive swages, beginning with a cylindrical or shaped piece.

Since the cylinder 5 is thin, the collet 6, even though it is not split, can be easily adjusted to suit on the axis of its balance.

The height of the cylinder 5 is chosen in respect of the distance to be provided between the spring 8 and the balance.

FIG. 6 shows that the balance spring rests freely on the plate and is held in a precisely centered position by the edge 27 of one collect wing 25 and by the pins 9 and 10. The latter are located in radial planes passing through the axis of the stud 4 and defining a solid angle of 120°. Moreover, the eccentric heads of the studs 7 are adjusted so that the edge 27 of the collet 6 lies in a radial plane of the plate 2 forming solid angles of 120° with the radial planes of the pins 9 and 10. The distance from the pin 10 to the axis of the stud 4 is adjusted by the micrometer 19 to be equal to the radius of the arc of the edge 26 plus one-third of the pitch of the balance spring. The pin 9 is spaced one-third of the balance-spring pitch farther from the collet axis than the pin 10. In the case of a balance spring spiralling in the opposite sense, the spring rests against the edge 32 instead of the edge 27. In order that the edge 32 can be positioned 120° from the pins 9 and 10, there is used another plate 2 having studs 7 so located as to permit this adjustment.

It is also possible, of course, to provide in the plate 2 another pair of holes into which the studs 7 fit, where the balance spring spirals in the opposite sense. The pins 9 and 10 can be adjusted in a reverse manner for such a spring.

Modern techniques for manufacturing balance springs enable so remarkable a consistency that, for a given series or production run, it is possible to determine beforehand the position along the length of the spring of the inner end of the active part of the spring. Consequently, when the balance and its spring are set in the movement, the rules determining the pinning point, well known to the specialist, are automatically observed. Once the position of this inner end is determined for a run of balance springs, there is chosen a series of collets of which the diameter of the ends 26 so corresponds to the position of this inner end that, in the position shown in FIG. 6, the edge 27 nicely touches the spring 8 at the desired spot without causing the slightest deformation in the spring. The positions of the pins 9 and 10 are then adjusted in dependence on the diameter of the edge 26 of that particular run of collets.

In accordance with the invention, it is not essential that the pins 9 and 10 are located along radii located 120° from the edge 27. The three points of support constituted by these two pins and the edge always ensure accurate centering of the balance spring with respect to the axis of the collet, whatever their angular positions along the inner coil of the spring. By way of example, the respective angular positions of the pins 9 and 10 can be chosen in dependence on the shape of the base 25 of the collet, so that the pins are positioned at those points where there is more room between the base and the spring. The distances of the pins 9 and 10 from the axis of the collet are calculated, of course, in dependence on their angular position and the pitch of the balance spring.

It is apparent from the foregoing description that the spring 8 is placed about the collet and the pins 9 and 10 without causing the slightest deformation of its inner coil.

The combination of the pins 9 and 10 and the edge 27 not only centers the balance spring but also enables gauging of the dimensions of the inner coil. Now, if for the same run or series of balance springs the inner ends are cut off so that the first coil always has the same predetermined size, it is known from experience that the rules governing the pinning point are automatically satisfied with sufficient precision.

Before placing the balance spring on the plate 2, the hook formed at its inner end during manufacture is removed simply by cutting off a length of the inner part of the spring, so that the dimensions of its first coil are smaller than required. The balance spring thus prepared is placed on the plate 2 to surround the collet and the pins 9 and 10 freely. To center and gauge the inner coil, the spring is "screwed" by turning it about the pins 9 and 10 and the edge 27 until it touches all three without suffering deformation.

Since the thickness of the wings 25 is equal to the height of the spring 8, and since both the wings and the spring rest on the plate 2, the upper edge 28 of the spring and the upper face of the wings are coplanar.

Before attaching the spring to the collet, the generator 22 and the optical system 23 are adjusted first of all to make the laser beam axis coincide at least approximately with the edge 27. The beam is aimed at this edge to simultaneously fuse together the spring inner end and the wing corner.

Good results have been obtained with a ruby laser, the power of which is varied by manually controlling the electrical supply circuits, as well as by interposing between the laser output and the target a convergent optical system, a diaphragm, and optical filters.

Using an incident beam having an included angle of about 9°, and regulating its intensity so that the spring 8 melts to about one-half its height, the resulting weld between the spring and the collet meets every requirement.

To prevent the laser beam from accidentally moving the balance spring while welding, a block 29 (FIG. 3) covers at least the first inner coil of the spring to press the latter against the plate 2 without deforming it. This block has a central opening 30 that fits the collet cylinder 5, as well as a hole (not shown) at the spot where the laser beam must pass.

Under these conditions of operation, the impact of the beam, at the level of the edge 28 and the upper face of the wings 25, is positioned within a circular zone 31 (FIG. 6) that does not reach to the second coil of the balance spring 8. The diameter of this welding zone can vary from 5/100 to 40/100 mm, depending on the pitch of the spring, without affecting the requirements for attaching the spring to the collet.

The inner end of the spring, which may extend beyond the edge 28, is automatically cut off by the beam at right angles to this edge, when operating under the described conditions.

The method of the invention obviously is not limited to the kind of collet shown in FIG. 6. For example, if the collet incorporates part of a spiral surface, the laser beam can be aimed at any generant of the surface of contact between the balance spring and the collet. These two parts are in intimate contact, because there is no air space between them. It is essential that the faces of the spring and the collet are flush at the point where the beam strikes.

However, it is not necessary that these two faces are perpendicular to the axis of the beam; they can also be parallel to this axis. With reference to FIG. 6, if the extreme inner edge of the spring 8 is positioned flush with the straight edge ending at the corner 27, the laser beam will work tangentially. For long production runs, a system of fixed stops and pins can be provided in place of the adjustable stops, or studs, 7 and pins 9 and 10, for each run.

The second embodiment comprises a work table 2a similar to that of the first embodiment. To position both the collet 6a and the balance spring 8, the table embodies a vertical projection 33, which has an outer face 34 of which the shape matches the inner coil of the spring 8, and an inner face 35 that defines a cavity fitting the collet 6a. The projection is open at 36 to make room for the inner end of the balance spring.

Figure 7:
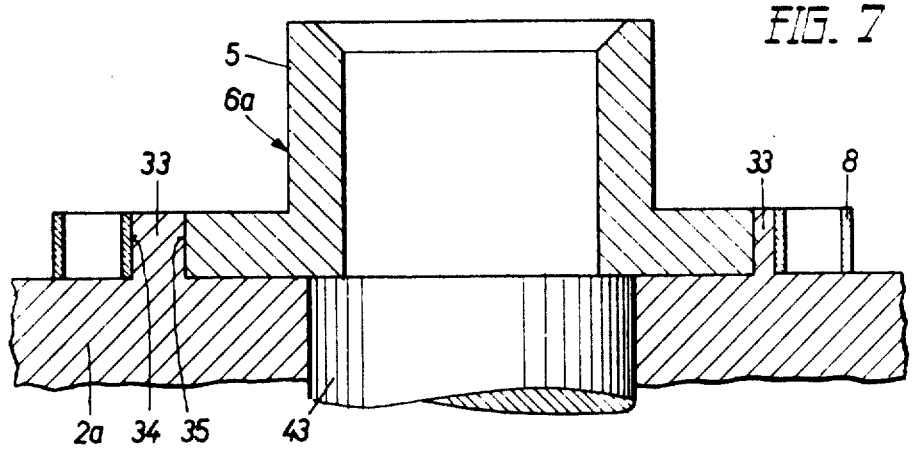
FIG. 7 is a diametrical section of part of a second embodiment, with collet and balance spring.

FIG. 7 shows that the projection is made in one piece with the table 2a. It, the table and the projection are made of synthetic plastic, they can be molded. They can also be made in a block of metal by first of all driving a tool having the shape of the collet 6a into one surface of the block to form the inner face 35 of the projection 33, and then forming the projection outer face 34 and the opening 36 by milling. The projection 33 can also be made of one or more finished parts that are fixed to the table 2a. Obviously, the inner face 35 need not have the exact shape of the collet; it is only essential that it is so shaped that the collet is held in a precise angular position.

Figure 8:
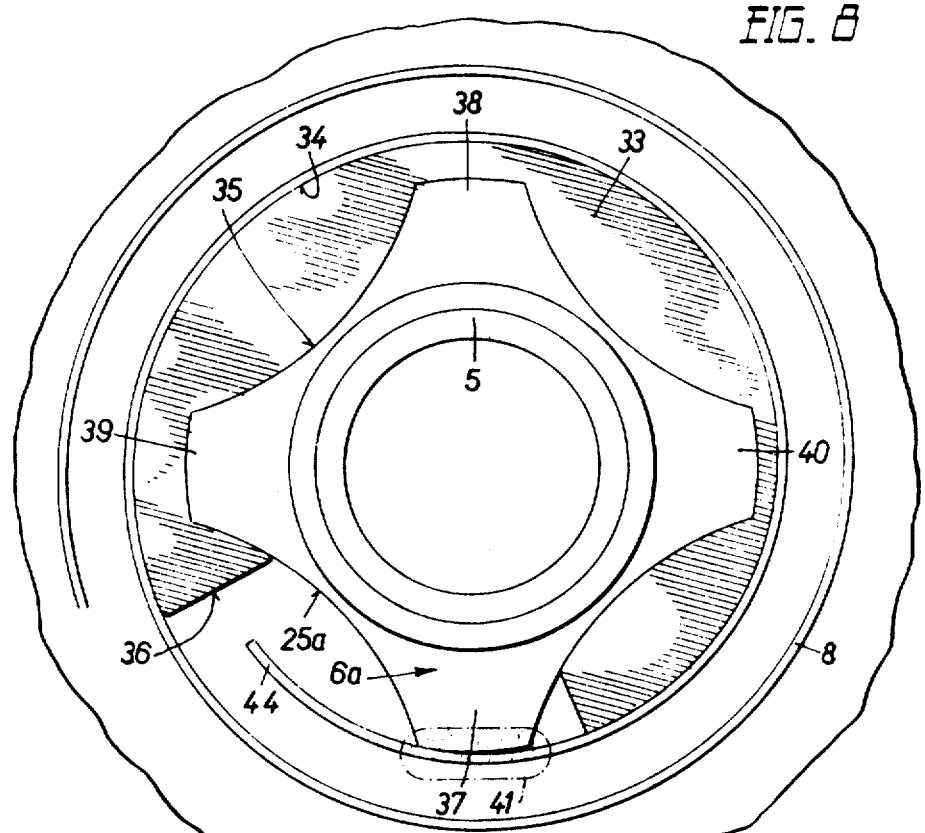
FIG. 8 is a top view of the part seen in FIG. 7.

The collet 6a is composed of a cylinder 5, thin but of standard height, and of a base 25a that is about as thick as the spring 8 is high. The base 25a has indentations defining an attaching arm 37, an arm 38 balancing the arm 37, and two diametrically opposed stop arms 39 and 40. FIG. 8 shows that these arms are all shaped the same and spaced 90° apart. The end width of these arms is so chosen that the end of the attaching arm 37 follows the spring 8 along a sufficient length to ensure a satisfactory weld.

The collet 6a is advantageously manufactured by profile turning its cylinder 5 and a circular base, and then blanking the base, this latter operation being accompanied by finishing the central hole of the collet to correct its diameter.

After the inner hook and a central portion have been removed from the balance spring, the latter is placed on the table 2a freely about the projection 33. Once the spring is so placed, the radial edge of the projection opening 36 can be used as a guide in the sense that the inner end of the spring can be positioned opposite this edge. As in the first embodiment, the spring is turned about the projection 33 until its inner coil touches along the entire length of the outer face 34 without any distortion of this coil.

Once the spring is so positioned, a segment of the spring inner end lies in the immediate neighborhood of the end of the attaching arm 37; the upper edge of the spring is flush with the upper face of the arm 37.

Figure 9:
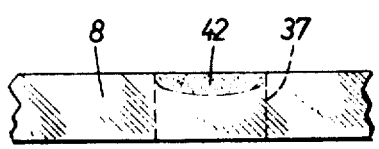
FIG. 9 is a side view of part of the colleted balance spring.

The spring is welded to the collet by focussing the laser beam on the zone 41 encompassing the end of the arm 37 and the flush edge of the spring. The beam is easily shaped using a generally rectangular diaphragm, which enables the beam to act on the collet and the spring over a relatively long segment of the latter, without any risk of the beam falling on the next coil or of affecting a large area of the arm 37. The intensity of the beam is adjusted so that the depth of the welding zone 42 (FIG. 9) will never exceed one-half of the height of the spring, and preferably will not exceed one-third of this height.

In those cases where it is sufficient that the length of the welding zone 42 is approximately equal to the height of the spring 8, the beam can be focussed to form a circular zone centered on the middle of the end of the arm 37. Alternatively, by moving the beam along the joint between the spring and the end of the arm 37, a series of spot welds can be made.

As in the first embodiment, a block can be placed on the spring to prevent it from moving while welding. The block presses the spring against the table 2a without distorting it, and incorporates an opening for the laser beam.

The colleted balance spring is freed from the projection 33 by a pin 43 pushed against the collet 6a.

In this embodiment, the collet 6a is centered on the table 2a solely by the projection inner face 35. Of course, centering can also be ensured by a central pin over which the collet cylinder 5 fits and can be adjusted.

With this method, the end 44 of the spring, extending beyond the arm 37, remains attached to the spring and preserves its natural shape, so that the active part of the spring cannot be harmed.

Although the preferred embodiments of the invention have been described, the scope of, and the breadth of protection afforded to, the invention are limited solely by the appended claims.

I claim:

1. A method for welding the inner end of a timepiece balance spring to a collet, comprising the steps of: positioning one edge portion of a substantially fully relaxed balance spring flush with a face of said collet and along a line of contact with said collet substantially parallel to the axis of said spring with substantially no distortion thereof; firmly holding said spring and collet in their respective positions; focusing a laser beam, directed at least approximately along said line of contact on the area of flush contact of said edge portion of said spring and said collet face that surrounds said line of contact; and welding said spring and collet together.

2. The method as defined in claim 1, including the step of adjusting the focus of the beam so that the incident beam defines an included angle of about 9°.

3. A method for welding the inner end of a timepiece balance spring to a collet, comprising the steps of: placing one portion of a substantially fully relaxed balance spring flush with a face of said collet and along a line of contact with said collet substantially parallel to the axis of said spring; positioning a segment of said spring having a length at least equal to the height of said spring adjacent a peripheral zone of said collet; firmly holding said spring and said collet in their respective positions; focusing a laser beam, directed at least along a direction substantially parallel the axis of said collet, on said peripheral zone and adjacent spring segment; adjusting the intensity of said laser beam; and welding said spring to said collet to a depth not exceeding one-half of the height of the blade of said spring and along a length at least equal to the height of said spring blade.

4. The method as defined in claim 3, including the step of regulating the beam intensity so that the weld depth does not exceed one-third of the height of the spring blade.

5. The method as defined in claim 3, including the step of shaping the beam so that it covers a narrow elongated zone of the collet extending along the length of the spring.

6. The method as defined in claim 3, including the step of moving the beam to form a succession of spaced spot welds along the segment of the spring.

7. A method for welding the inner end of a timepiece balance spring to a collet, whereby said end of the spring retains its original shape, including the steps of placing on a support a collet having a circular cylindrical side face coaxial with said collet and a balance spring having a spirally shaped inner end, rotating the balance spring around the axis of the collet to place the balance spring and the collet together in the position they will occupy after the spring is attached, maintaining the spring completely relaxed, bringing the inner end of the spring into contact, along a line parallel to the collet axis, with said cylindrical side face, placing an edge of the spring flush with a plane face of the collet which bounds said cylindrical side face, firmly holding the spring and the collet in their respective positions, focussing a laser beam directed along said line of contact at the spot of contact between said spring edge and the corresponding edge of said cylindrical side face, and welding the spring and collet together.

8. The method as defined in claim 7, including the steps of shaping the laser beam with a diaphragm so that only a narrow zone of the beam strikes the collet along the edge formed between said cylindrical side face and said plane face, focussing the laser beam on said zone and on the adjacent spring edge and adjusting the beam intensity to weld said zone of the collet and the corresponding portion of the spring along a length at least equal to the height of the spring blade.

9. The method defined in claim 7, including the step of adjusting the focus of the beam so that the focused beam defines an included angle of about 9°.

10. The method defined in claim 7, including the step of adjusting the beam intensity to weld the spring to the collet to a depth not exceeding one-half of the spring blade height.

* * * * *